United States Patent
Oguri et al.

(10) Patent No.: US 7,652,805 B2
(45) Date of Patent: Jan. 26, 2010

(54) IMAGE-READING DEVICE

(75) Inventors: Hirofumi Oguri, Nagoya (JP); Tetsuya Kato, Chiryu (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 325 days.

(21) Appl. No.: 11/475,040

(22) Filed: Jun. 27, 2006

(65) Prior Publication Data

US 2007/0002409 A1 Jan. 4, 2007

(30) Foreign Application Priority Data

Jun. 30, 2005 (JP) .............................. 2005-193167

(51) Int. Cl.
*H04N 1/04* (2006.01)
*H04N 1/40* (2006.01)
(52) U.S. Cl. .................. 358/482; 358/445; 358/474; 358/483; 250/208.1
(58) Field of Classification Search ............... 358/483, 358/482, 474, 494, 497, 496, 487, 406, 472, 358/473, 512–514, 505, 486, 445, 488; 250/208.1, 250/216, 234–236; 382/312, 313, 318, 319; 355/40, 41; 399/211, 212
See application file for complete search history.

(56) References Cited

U.S. PATENT DOCUMENTS

| | | | | |
|---|---|---|---|---|
| 5,036,397 | A * | 7/1991 | Nagabusa | 348/311 |
| 5,640,251 | A * | 6/1997 | Tone et al. | 358/482 |
| 6,721,010 | B1 * | 4/2004 | Chen et al. | 348/322 |
| 7,034,969 | B2 * | 4/2006 | Watanabe | 358/513 |
| 7,379,217 | B2 * | 5/2008 | Amimoto et al. | 358/487 |
| 2002/0015194 | A1 | 2/2002 | Watanabe | |
| 2004/0105135 | A1 | 6/2004 | Sawada | |
| 2007/0035785 | A1 * | 2/2007 | Kuan | 358/474 |

FOREIGN PATENT DOCUMENTS

| | | |
|---|---|---|
| JP | 63 20952 | 1/1988 |
| JP | H09-247385 A | 9/1997 |
| JP | S63-020951 A | 1/1998 |
| JP | 2001-274962 A | 10/2001 |
| JP | 2002-118717 A | 4/2002 |
| JP | 2003 298813 | 10/2003 |

OTHER PUBLICATIONS

Japan Patent Office, Office Action in counterpart Patent Application No. JP 2005-193167, mailed Jul. 29, 2009.

* cited by examiner

*Primary Examiner*—Cheukfan Lee
(74) *Attorney, Agent, or Firm*—Baker Botts L.L.P.

(57) ABSTRACT

An image-reading device includes a plurality of image sensor chips, a switch, an output selector and a controller. The plurality of image sensor chips is juxtaposed along a line extending in a widthwise direction of an original document carrying images thereon. Each image sensor chip includes a plurality of image sensors, reads the images on the original document, and generates image signals. The switch is configured to combine at least two image sensor chips into one virtual image sensor chip. The output selector allows the image signals from the virtual image sensor chip and remaining image sensor chip to be outputted. The controller controls the switch depending on the width of the original document, and controls, depending on the width of the original document, the output selector to allow the image signals to be outputted.

26 Claims, 9 Drawing Sheets

FIG.1

RELATED ART

IMAGE-READING DEVICE

BACKGROUND OF THE INVENTION

1. Field of the Invention

The present invention relates to an image-reading device, and particularly to an image-reading device employing a contact image sensor (CIS) having a plurality of image sensor integrated circuits (IC) chips arranged linearly.

2. Description of Related Art

Figure 1:
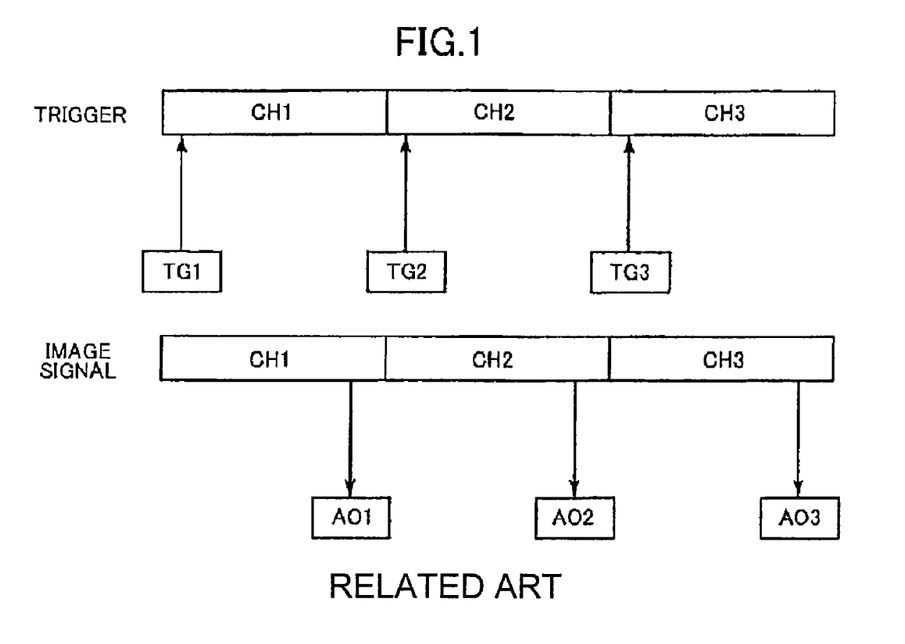
FIG. 1 is a block diagram showing a structure of a conventional image-reading device.

A conventional image-reading device such as that disclosed in Japanese unexamined patent application publication No. SHO-63-20952 includes a contact image sensor having a plurality of image sensor IC chips arranged linearly. In the example shown in FIG. 1, trigger signals TG1, TG2, and TG3 are inputted simultaneously into image sensor IC chips CH1, CH2, and CH3 so that image signals AO1, AO2, and AO3 are read in parallel from the image sensor IC chips CH1, CH2, and CH3.

One conventional image-reading device disclosed in Japanese unexamined patent application publication No. 2003-298813 includes a contact image sensor having a plurality of image sensor IC chips arranged linearly and divided into blocks of a natural multiple of three. Each block outputs an image signal to a triple-channel analog front end (AFE), thereby improving the speed for reading image signals. The triple-channel AFE is widely used in image-reading devices because, along with single-channel AFEs, triple-channel AFEs are more popular than AFEs having another number of channels and are mass-produced and, therefore, less expensive.

However, this conventional technology can only read an image at one speed, even when the original document is of a narrower width that does not require all image sensor IC chips. Accordingly, the time required to read an image with this conventional image-reading device is governed by the number of pixels in each image sensor IC chip if all chips have the same number, or by the number of pixels in the image sensor IC chip having the largest number when the number of pixels is not uniform.

SUMMARY OF THE INVENTION

In view of the above-described drawbacks, it is an objective of the present invention to provide an image-reading device capable of reading a narrow original faster.

In order to attain the above and other objects, the present invention provides an image-reading device including a plurality of image sensor chips, a switch, an output selector and a controller. The plurality of image sensor chips is juxtaposed along a line extending in a widthwise direction of an original document carrying images thereon. Each image sensor chip includes a plurality of image sensors, reads the images on the original document, and generates image signals. The switch is configured to combine at least two image sensor chips into one virtual image sensor chip. The output selector allows the image signals from the virtual image sensor chip and remaining image sensor chip to be outputted. The controller controls the switch depending on the width of the original document, and controls, depending on the width of the original document, the output selector to allow the image signals to be outputted.

Another aspect of the present invention provides an image-reading device including a plurality of image sensor units, a switch, an output selector and a controller. The plurality of image sensor units is juxtaposed along a line extending in a widthwise direction of an original document carrying images thereon. Each image sensor unit includes a plurality of image sensors, reads the images on the original document, and generates image signals. The switch is configured to divide the image sensor unit into a plurality of sensor segments so that each sensor segment includes at least one of the image sensors. The output selector allows the image signals from the sensor segment and remaining image sensor unit to be outputted. The controller controls the switch depending on the width of the original document, and controls, depending on the width of the original document, the output selector to allow the image signals to be outputted.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

An image-reading device according to preferred embodiments of the present invention will be described while referring to the accompanying drawings wherein like parts and components are designated by the same reference numerals to avoid duplicating description.

Figure 2:
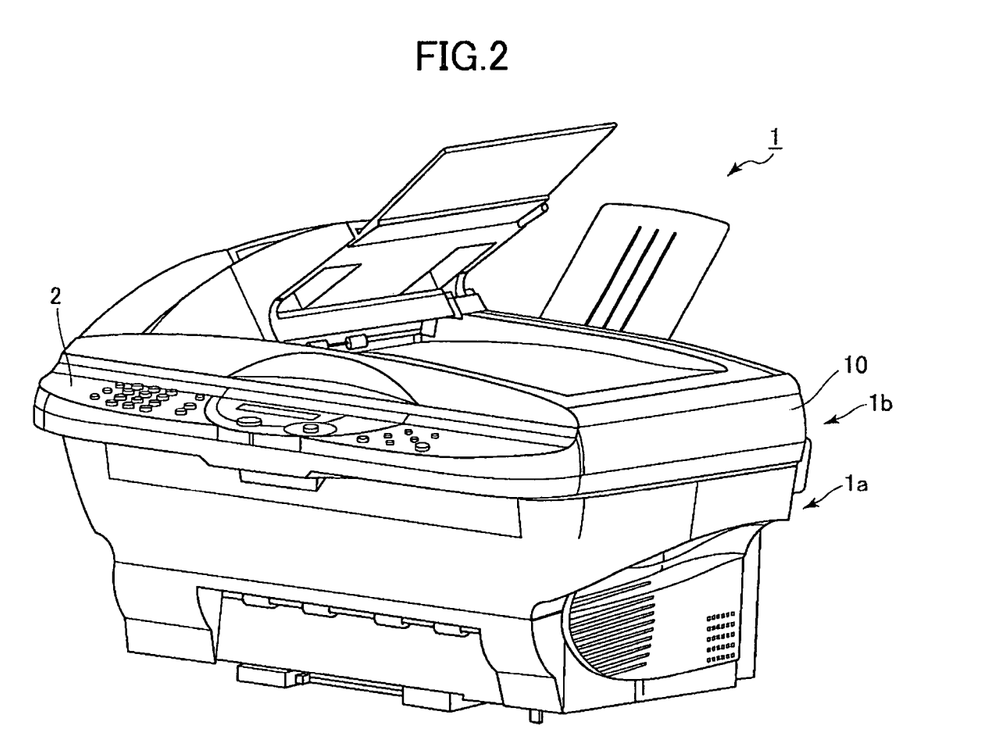
FIG. 2 is a perspective view of a multifunction device incorporating an image-reading device according to a preferred embodiment of the present invention.

FIG. 2 is a perspective view of a multifunction device 1 incorporating an image-reading device 10 according to the preferred embodiment. The multifunction device 1 has a clamshell structure configured of a lower casing 1a, and an upper casing 1b mounted on the lower casing 1a and being capable of opening and closing thereon. The image-reading device 10 is provided in the upper casing 1b. A control panel 2 is also provided on a front surface side of the upper casing 1b. The multifunction device 1 also includes a laser printer or other image-forming device in addition to the image-reading device 10. However, since this image-forming device is not directly related to the present invention, the device will not be described herein.

Figure 3:
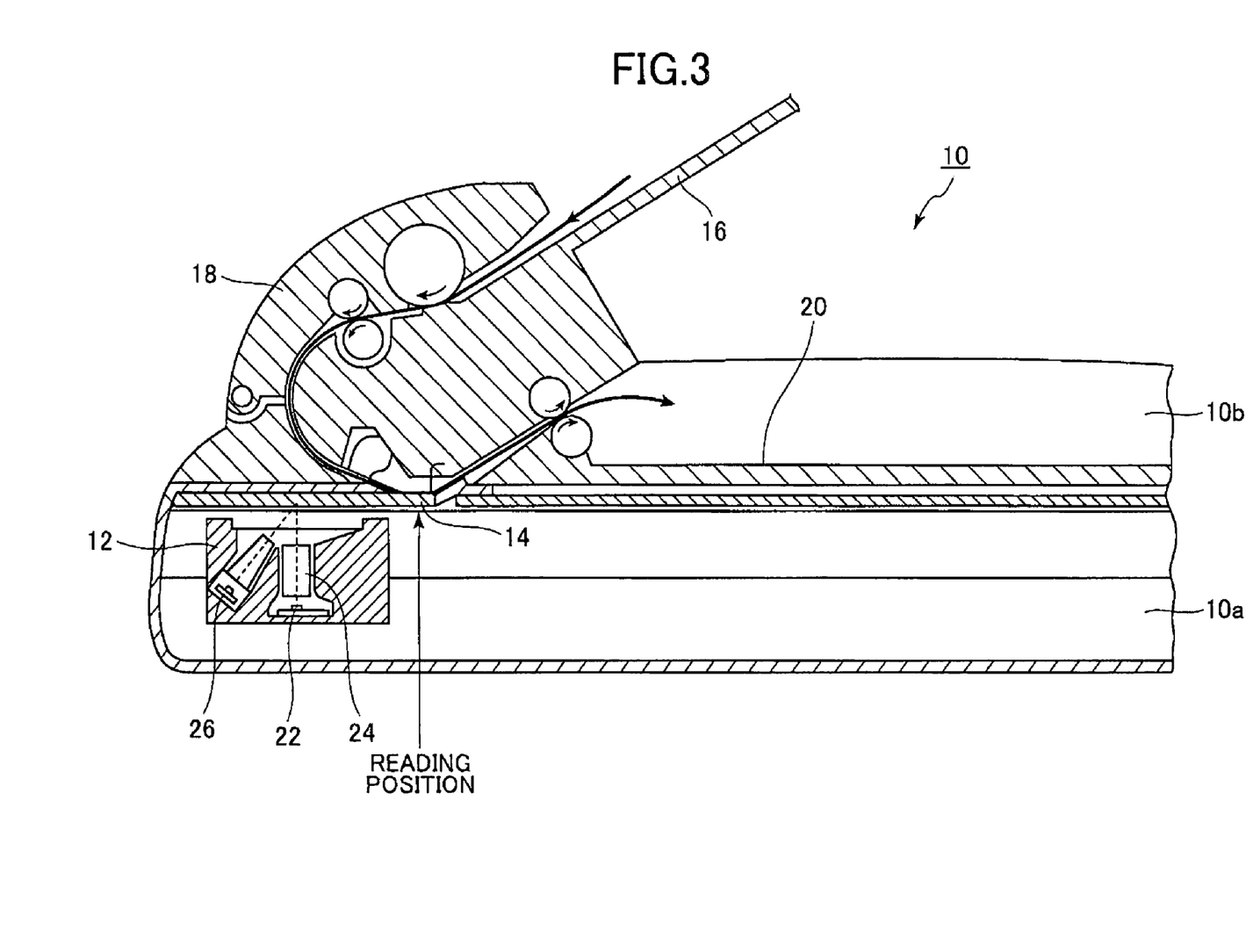
FIG. 3 is a cross-sectional view of the image-reading device according to the preferred embodiment.

FIG. 3 is a cross-sectional view of the image-reading device 10. As shown in FIG. 3, the image-reading device 10 includes a flatbed mechanism and an automatic document feeder (ADF). The image-reading device 10 itself also has a clamshell structure configured of a flatbed unit 10a and a cover 10b attached to the flatbed unit 10a and capable of opening and closing thereon.

The flatbed unit 10a includes a contact image sensor 12 and a platen glass 14. The cover 10b includes an original tray 16, an original conveying device 18, and an original receiving tray 20.

The contact image sensor 12 includes light-receiving elements 22, such as photodetectors, a SELFOC lens 24, and a light source 26. The light source 26 irradiates light onto the original document at a reading position, and the light-receiving elements 22 receive the light reflected off the original through the SELFOC lens 24. The contact image sensor 12 is configured to read an image based on the results of light received by the light-receiving elements 22. A driving mechanism (not shown) is also provided for driving the contact image sensor 12 to reciprocate in the left-to-right direction in FIG. 3 so that the light-receiving elements 22 are moved directly below the reading position in the actual reading process.

Figure 4:
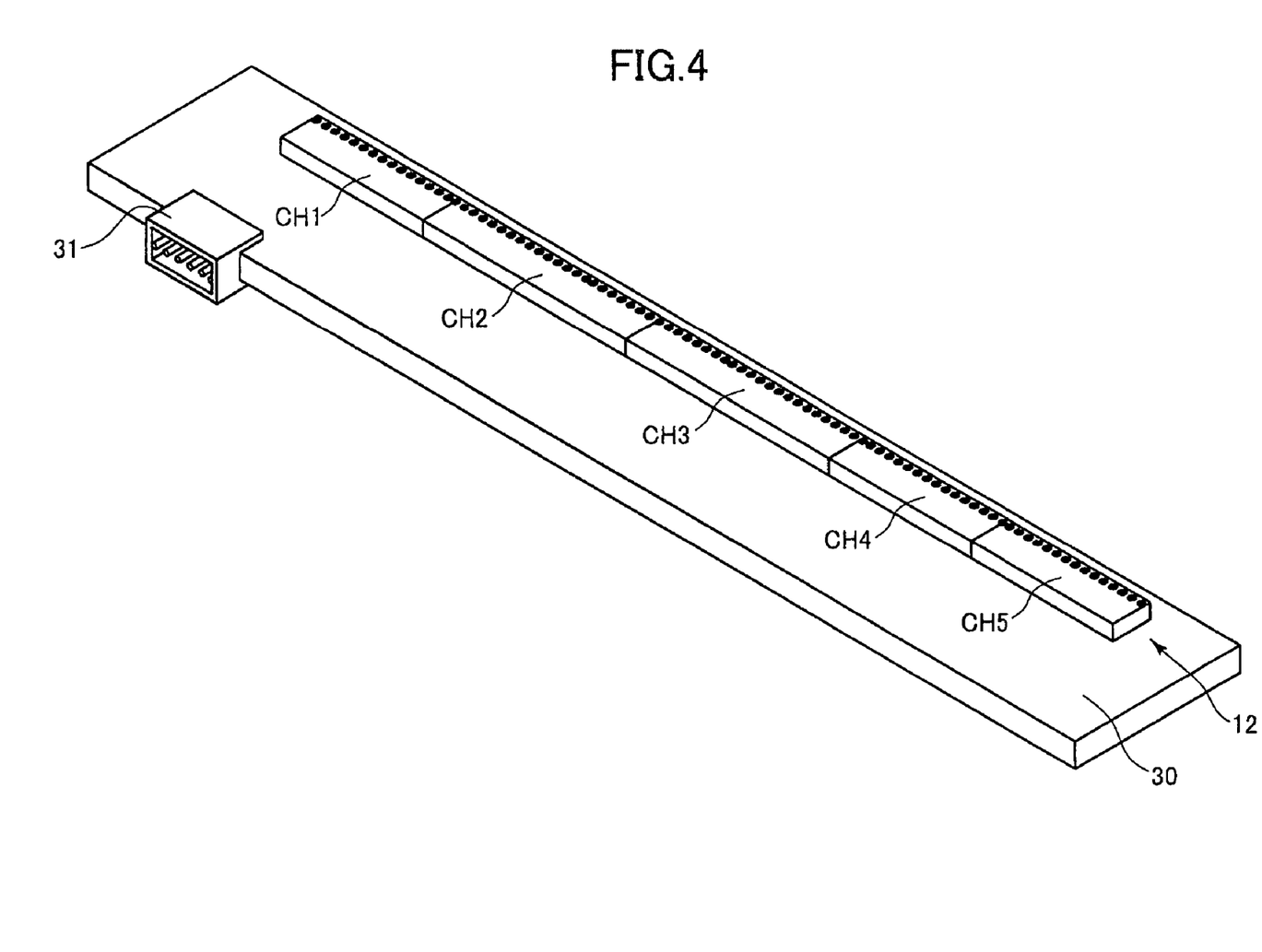
FIG. 4 is a perspective view of a contact image sensor shown in FIG. 3.
Figure 5:
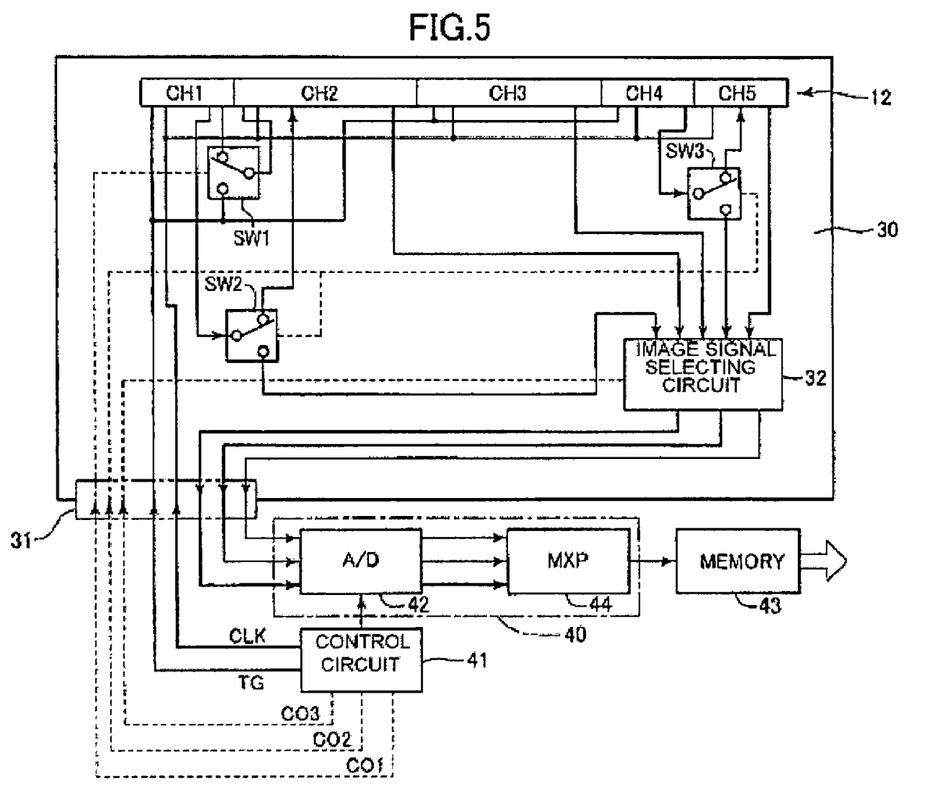
FIG. 5 is a block diagram showing an electrical configuration of the image-reading device according to the preferred embodiment.
Figure 7:
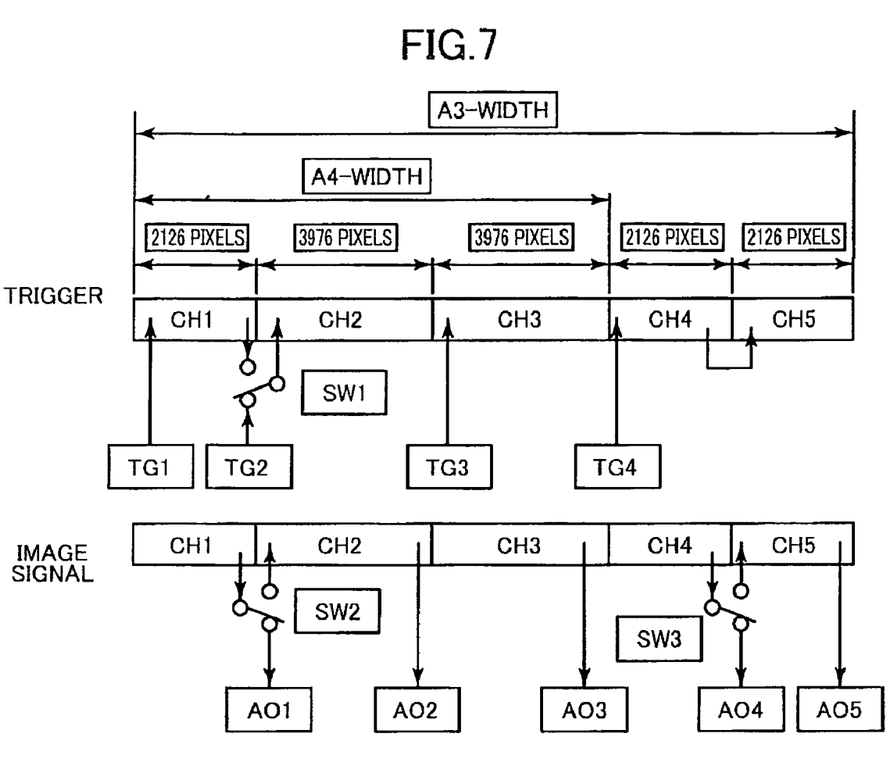
FIG. 7 is a block diagram showing a configuration of the image-reading device according to the preferred embodiment.

As shown in FIGS. 4 and 5, the contact image sensor 12 is mounted on the surface of a substrate 30 and includes five image sensor IC chips ch1-ch5 aligned in a single row and having light-receiving elements that are also arranged linearly. Each of the image sensor IC chips ch1-ch5 is rectangular in shape and includes a plurality of light-receiving elements spaced at intervals in a single row. In the preferred embodiment, A3-size and A4-size sheets are disposed so that a direction in which a short dimension of the A3-size or A4-size sheets extends is identical to a direction in which the image sensor IC chips ch1-ch5 are arranged. The contact image sensor 12 is configured to support reading of an original having a width equivalent to an A3-size sheet. Each of the image sensor IC chips ch1-ch5 has a resolution of 1200 dpi (47.2 dot/mm). As shown in FIG. 7, the image sensor IC chip ch1 has light-receiving elements for 2,126 pixels; the image sensor IC chip ch2 for 3,976 pixels, the image sensor IC chip ch3 for 3,976 pixels; the image sensor IC chip ch4 for 2,126 pixels; and the image sensor IC chip ch5 for 2,126 pixels. Hence, the contact image sensor 12 has a total of 14,330 light-receiving elements spaced at intervals in a single line.

Figure 6:
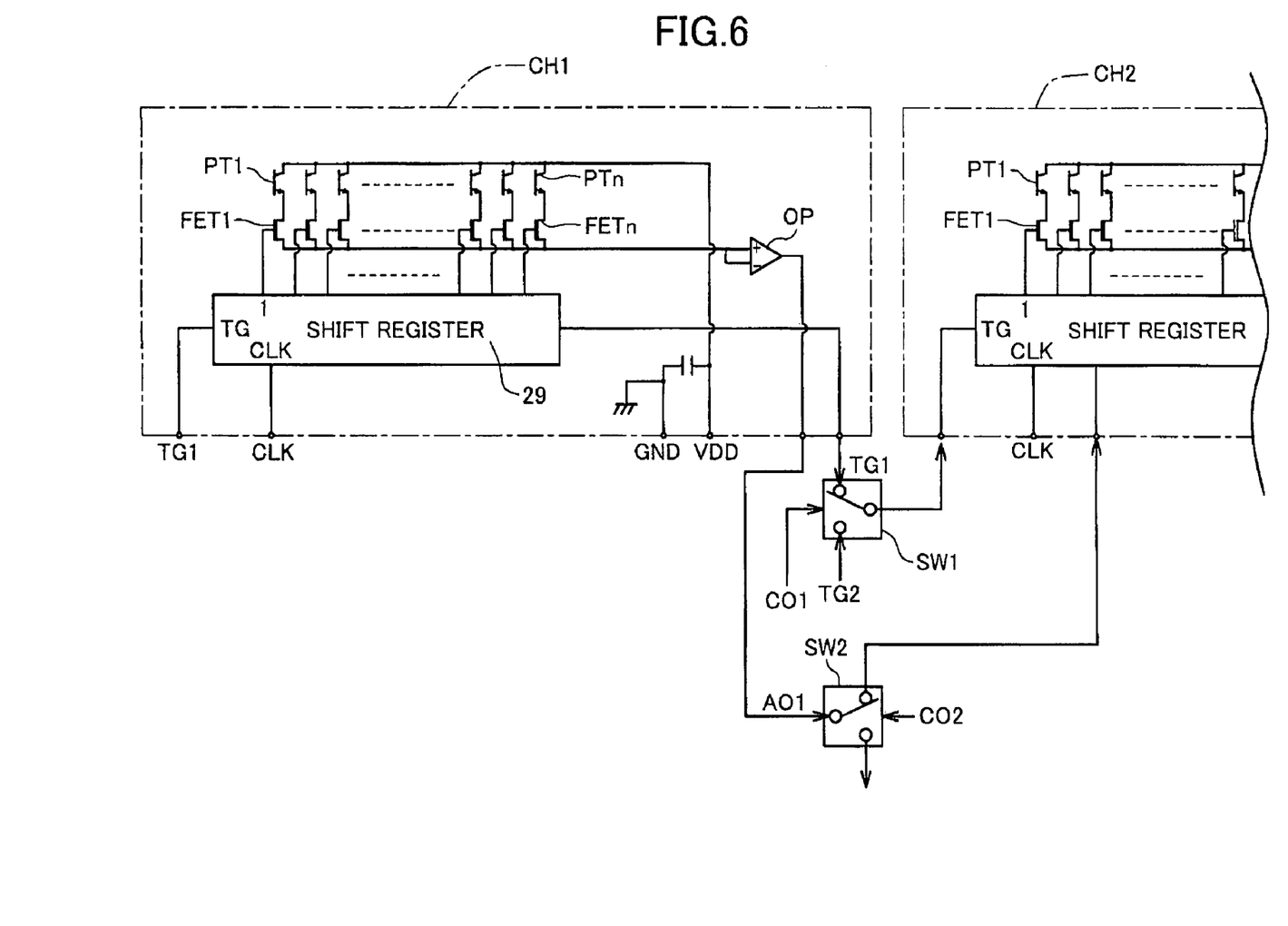
FIG. 6 is a circuit diagram illustrating an example structure of image sensor IC chips shown in FIG. 5.

As shown in FIG. 6, each of the image sensor IC chips ch1-ch5 has phototransistors PT1-PTn constituting the respective prescribed number of light-receiving elements. Upon receiving light, the phototransistors PT1-PTn store an electric charge corresponding to the amount of received light. The basic circuit structure of the image sensor IC chips ch1-ch5 themselves is identical to the conventional image sensor IC chips. When a trigger signal TG outputted from a control circuit 41 described later is inputted into the image sensor IC chip, a shift register 29 provided in the chip sequentially turns on a plurality of field effect transistors FET1-FETn in a fixed direction according to an inputted clock signal CLK. As a result, the electric charges stored in the phototransistors PT1-PTn are discharged in a fixed sequence. The electric charges are amplified by an amplifier OP and outputted serially as image signal AO1 to AO5 from the image sensor IC chips ch1-ch5 respectively. The image signals AO1 to AO5 are analog signals. The image sensor IC chips ch1-ch5 also include a voltage terminal VDD for supplying a drive voltage as required power for operating the components in the image sensor IC chips ch1-ch5, and a terminal GND connected to ground.

As shown in FIG. 5, the connector 31 is provided on an edge of the substrate 30; and switches SW1, SW2, and SW3 and an image signal selecting circuit 32 are provided on the same surface of the substrate 30 as the contact image sensor 12. These components are connected by a wiring pattern. One end of the wiring pattern is connected to the connector 31 so that a device external to the substrate 30 connected to the connector 31 via a cable (not shown) can supply power to and exchange signals with the image sensor IC chips ch1-ch5.

The image-reading device 10 includes the triple-channel AFE 40, the clock control circuit 41 and a memory device 43. The triple-channel AFE 40 and the clock control circuit 41 are connected to the connector 31 of the substrate 30. The triple-channel AFE 40 is configured of an analog/digital (A/D) converter 42 and a timing control circuit 44.

The switch SW1 has a first input terminal connected to the image sensor IC chip ch1, a second input terminal connected to the control circuit 41 for receiving the trigger signal TG therefrom, and a switch terminal connected to the image sensor IC chip ch2. The switch SW1 is switched according to a control signal CO1 inputted from the control circuit 41 to select whether to input a trigger signal TG1 (outputted from the image sensor IC chip ch1 after the image sensor IC chip ch1 reads the image) or a trigger signal TG2 into the image sensor IC chip ch2.

The switch SW2 has a switch terminal connected to the image sensor IC chip ch1 for receiving the image signal A01 shifted out from the image sensor IC chip ch1, a first output terminal connected to the image sensor IC chip ch2, and a second output terminal connected to the image signal selecting circuit 32. The switch SW2 is switched according to a control signal control signal CO2 inputted from the control circuit 41 to select whether to serially input the image signal AO1 outputted from the image sensor IC chip ch1 into the image sensor IC chip ch2 or whether to output the image signal A01 as is.

The switch SW3 has a switch terminal connected to the image sensor IC chip ch4 for receiving the image signal A04 shifted out from the image sensor IC chip ch4, a first output terminal connected to the image sensor IC chip ch5, and a second output terminal connected to the image signal selecting circuit 32. The switch SW3 is switched according to the control signal CO2 inputted from the control circuit 41 to select whether to serially input an image signal AO4 outputted from the image sensor IC chip ch4 into the image sensor IC chip ch5 or whether to output the image signal image signal A4 as is. Hence, the switches SW2 and SW3 are switched in association with each other by the control signal CO2.

While not shown in detail in the drawings, the image signal selecting circuit 32 has five input terminals and three output terminals. The first input terminal of the image signal selecting circuit 32 is connected to the second output terminal of the switch SW2; the second input terminal to an output terminal of the image sensor IC chip ch2; the third input terminal to an output terminal of the image sensor IC chip ch3; the fourth input terminal to the second output terminal of the switch SW3; and the fifth input terminal to an output terminal of the image sensor IC chip ch5. The first, second, and third output terminals of the image signal selecting circuit 32 are all connected to the A/D converter 42 via the connector 31. The image signal selecting circuit 32 selects three image signals among the image signals that are inputted therein according to a control signal CO3 inputted from the control circuit 41, and outputs the three signals to the A/D converter 42 via the connector 31.

The control circuit 41 is configured to transmit the trigger signal TG and the clock signal CLK to the connector 31. The trigger signal TG is inputted into the image sensor IC chip ch1 as the trigger signal TG1, into the image sensor IC chip ch3 as a trigger signal TG3, and into the image sensor IC chip ch4 as a trigger signal TG4. The trigger signal TG can also be inputted into the image sensor IC chip ch2 via the switch SW1 as the trigger signal TG2 after the image sensor IC chip ch1 reads the image. The clock signal CLK is inputted into each of the image sensor IC chips ch1-ch5. The control circuit 41 also outputs the control signal CO1 for switching the switch SW1, the control signal CO2 for switching the switches SW2 and SW3, and the control signal CO3 for switching the image signal selecting circuit 32. The signal lines for the control signals CO1, CO2, and CO3 are indicated by dotted lines in FIG. 5 merely to help distinguish them from the other lines.

The A/D converter 42 is a triple-channel device capable of converting three analog signals to digital signals in parallel. The multiplexer 44 functions to multiplex three image signals converted to digital signals by the A/D converter 42 and output the multiplexed signals to the memory device 43.

The memory device 43 is configured of a random access memory (RAM), for example, and functions to store data of signals converted to digital data by the A/D converter 42 and multiplexed by the multiplexer 44 in association with addresses. The clock control circuit 41 also functions to control data that is read from the memory device 43 so that one line worth of image signals converted to digital data is outputted from the memory device 43 in a prescribed sequence. The sequence of the image signals is identical to the sequence in which the image signals were obtained when the fifteen image sensor IC chips ch1-ch5 are driven one at a time in order, for example.

As shown in FIG. 7, the contact image sensor 12 includes the image sensor IC chip ch1 for 2,126 pixels, the image sensor IC chip ch2 for 3,976 pixels, the image sensor IC chip ch3 for 3,976 pixels, the image sensor IC chip ch4 for 2,126 pixels, and the image sensor IC chip ch5 for 2,126 pixels arranged linearly from left to right in the order given. Between the image sensor IC chips ch1 and ch2 are provided the switch SW1 for determining whether to input the trigger signal TG1 outputted from the image sensor IC chip ch1 into the image sensor IC chip ch2 or to input the trigger signal TG2 into the image sensor IC chip ch2; and the switch SW2 for determining whether to shift in the image signal image signal AO1 shifted out from the image sensor IC chip ch1 into the image sensor IC chip ch2 or to output the image signal AO1 directly. Further, between the image sensor IC chips ch4 and ch5 is provided the switch SW3 for determining whether to shift in the image signal AO4 shifted out from the image sensor IC chip ch4 into the image sensor IC chip ch5 or to output the image signal AO4 directly.

Next, the operations of the image-reading device 10 according to the preferred embodiment will be described. Note that the image-reading device 10 is provided with a size input unit (not shown) into which a user inputs the size of the original and the position of the original, that is, whether the original is left-justified or centered.

Figure 8:
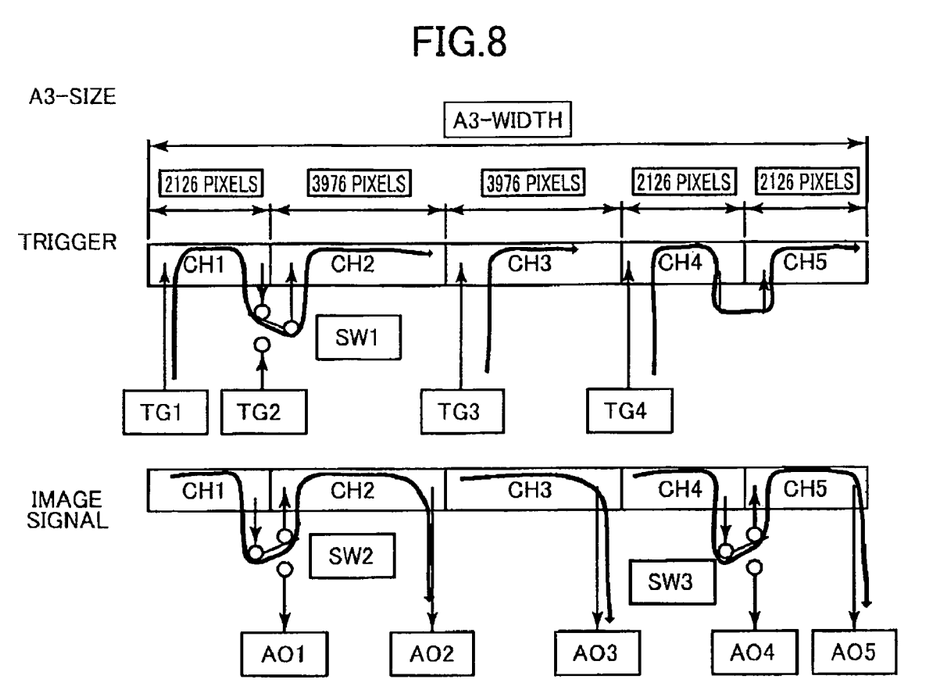
FIG. 8 is a block diagram showing a switching state when reading an A3-size original with the image-reading device shown in FIG. 7.

(1) Reading an A3-size Original (See FIG. 8)

All of the image IC chips ch1 to ch5 reads the image when reading an A3-size original. As shown in FIG. 8, when reading an A3-size original, the control circuit 41 switches the switch SW1 with the control signal CO1 so that the trigger signal TG1 outputted from the image sensor IC chip ch1 is inputted into the image sensor IC chip ch2. With the control signal CO2, the control circuit 41 also switches the switch SW2 so that the image signal AO1 serially outputted from the image sensor IC chip ch1 is serially inputted into the image sensor IC chip ch2, and switches the switch S3 so that the image signal AO4 outputted from the image sensor IC chip ch4 is serially inputted into the image sensor IC chip ch5. The control circuit 41 controls the image signal selecting circuit 32 with the control signal CO3 to select and output the image signals AO2, AO3, and AO5.

As a result, the image signal A02 is serially outputted from the image sensor IC chips ch1 and ch2, the image signal A03 is serially outputted from the image sensor IC chip ch3, and the image signal A05 is serially outputted from the image sensor IC chips ch4 and ch5.

The link between the image sensor IC chips ch1 and ch2 has the maximum number of pixels for reading an A3-size original. Hence, the time required for reading the A3-size original is the shift-out time that the image sensor IC chips ch1 and ch2 take to read the image. In other word, the time required for reading an A3-size original is determined by the total number of pixels for the image sensor IC chips ch1 and ch2 (6,102 pixels)×the pixel period.

Figure 9:
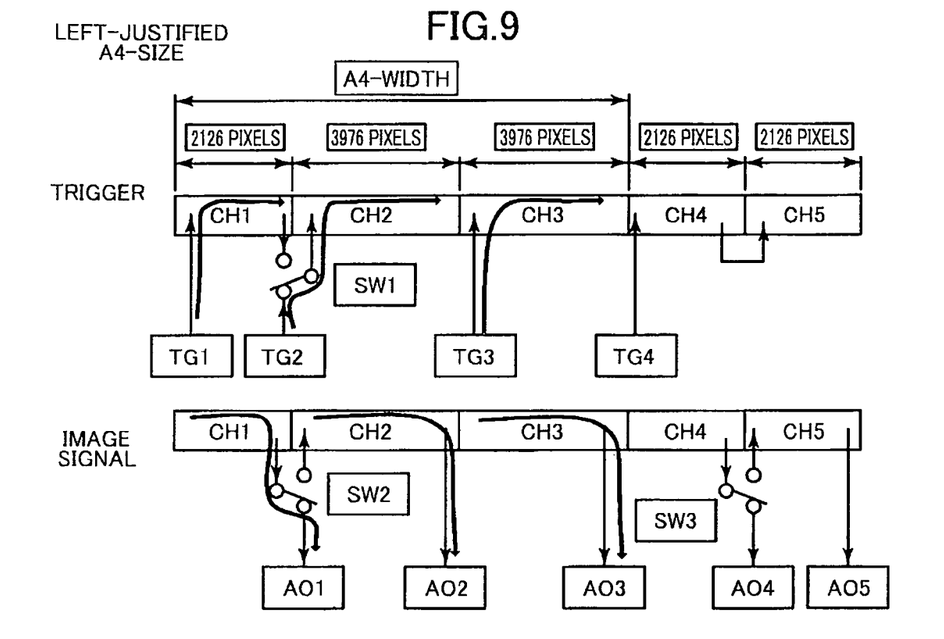
FIG. 9 is a block diagram showing a switching state when reading a left-justified A4-size original with the image-reading device shown in FIG. 7.

(2) Reading a Left-justified A4-size Original (See FIG. 9)

The image IC chips ch1, ch2 and ch3 read the image when reading a left-justified A4-size original. As shown in FIG. 9, when reading the left-justified A4-size original, the control circuit 41 switches the switch SW1 with the control signal CO1 so as to input the trigger signal TG2 into the image sensor IC chip ch2. The control circuit 41 also switches the switch SW2 with the control signal CO2 so as to output the image signal A01 serially outputted from the image sensor IC chip ch1 to the image signal selecting circuit 32 and switches the switch SW3 so as to output the image signal AO4 serially outputted from the image sensor IC chip ch4 to the image signal selecting circuit 32. The control circuit 41 also controls the image signal selecting circuit 32 with the control signal CO3 to select and output the image signals A01, AO2, and AO3.

As a result, the image signal A01 serially outputted from the image sensor IC chip ch1, the image signal A02 serially outputted from the image sensor IC chip ch2, and the image signal A03 serially outputted from the image sensor IC chip ch3 are outputted to the triple-channel AFE 40.

The image sensor IC chip ch2 or ch3 has the maximum number of pixels for reading the left-justified A4-size original. Hence, the time required for reading the left-justified A4-size original is the shift-out time that the image sensor IC chip ch2 or ch3 takes to read the image. In other word, the time required for reading the left-justified A4-size original is determined by the number of pixels in the image sensor IC chip ch2 or ch3 (3,976)×the pixel period. The time required for reading the left-justified A4-size original is about two-thirds the time required for reading the A3-size original.

Figure 10:
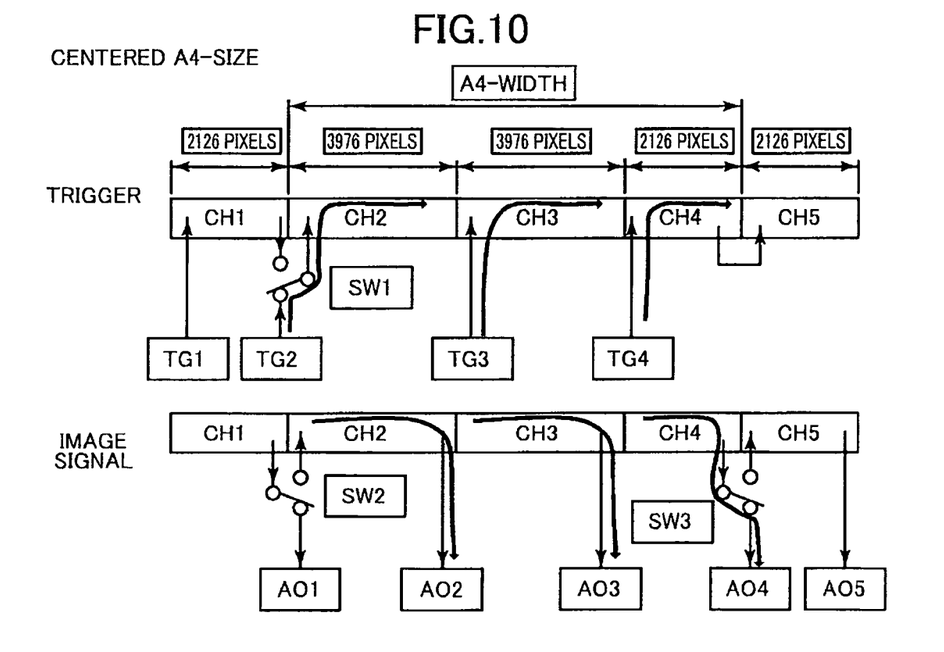
FIG. 10 is a block diagram showing a switching state when reading a centered A4-size original with the image-reading device shown in FIG. 7.

(3) Reading a Centered A4-Size Original (See FIG. 10)

The image IC chips ch2, ch3 and ch4 read the image when reading a centered A4-size original. As shown in FIG. 10, when reading a centered A4-size original, the control circuit 41 switches the switch SW1 with the control signal CO1 so as to input the trigger signal TG2 into the image sensor IC chip ch2. The control circuit 41 also switches the switch SW2 with the control signal CO2 so as to output the image signal A01 serially outputted from the image sensor IC chip ch1 to the image signal selecting circuit 32 and to switch the switch SW3 so as to output the image signal AO4 serially outputted from the image sensor IC chip ch4 to the image signal selecting circuit 32. The control circuit 41 also controls the image signal selecting circuit 32 with the control signal CO3 to select and output the image signals A02, AO3, and AO4.

As a result, the image signal A02 serially outputted from the image sensor IC chip ch2, the image signal A03 serially outputted from the image sensor IC chip ch3, and the image signal A04 serially outputted from the image sensor IC chip ch4 are outputted to the triple-channel AFE 40.

The image sensor IC chip ch2 or ch3 has the maximum number of pixels for reading the centered A4-size original. Hence, the time required for reading the centered A4-size original is the shift-out time that the image sensor IC chip ch2 or ch3 takes to read the image. In other word, the time required for reading the centered A4-size original is determined by the number of pixels in the image sensor IC chip ch2 or ch3 (3,976)×the pixel period. The time required for reading the centered A4 size original is about two-thirds the time required for reading the A3-size original.

Hence, the time required for reading image signals of an A4-size original is approximately two-thirds the time required for reading an A3-size original, thereby increasing the reading speed for an A4-size original. Further, when reading an A4-size original, the image-reading device 1 can read the original faster than when reading an A3-size original, whether the original is left-justified or centered.

With this construction, the image-reading device 1 can output image signals from the image sensor IC chips in parallel when the original has a narrower width by switching the connection state among the image sensor IC chips according to the width of the original being read. Since the reading time is governed by the image sensor IC chip reading the largest number of pixels, the present invention can reduce the image-reading time in comparison to the time required to read an original of the maximum width.

Since these image sensor IC chips ch1 to ch5 are arranged in the order m-pixel type, n-pixel type, n-pixel type, m-pixel type, and m-pixel type (m=2126, n=3976 in the preferred embodiment), the number of pixels in one line of a narrow original having a narrower width than an original-supporting surface for supporting an original having the maximum width can be set to (m+2n) pixels whether the narrow original is left-justified or centered on the original-supporting surface, making the image-reading process more versatile.

The image-reading device 1 can read image signals on three channels, whether the image signals are for an original of the maximum width or for an original of a narrow width. Hence, while the conventional image-reading device cannot read an original in a shorter time than the maximum number of pixels in image sensor IC chips for a maximum size original×the pixel period, the image-reading device 1 can read an original of a narrower width than the maximum width at the maximum number of pixels in image sensor IC chips for the narrow original×the pixel period. Using m and n as the number of pixels in the image sensor IC chips, the maximum number of pixels×the pixel period in this case can be calculated as $\{1/3 \cdot (3m+2n)\} = (m+2/3 \cdot n)$.

The image-reading device 1 can read an original with three channels, whether the original is an A3-size original or an A4-size original. Hence, while the conventional image-reading device cannot read an original in a shorter time than $(m+2/3 \cdot n)$ pixels×the pixel period, the image-reading device 1 can read an A4-size original at n pixels×the pixel period. Further, when reading an A4-size original, the image-reading device 1 achieves the same effects whether the original is left-justified or centered.

Since the image-reading device 1 performs image reading over the entire width of the original using all pixels in the image sensor IC chips, the image-reading device 1 can read an original having the maximum width in a time period equivalent to the maximum number of pixels in image sensor IC chips for reading an original of the maximum width×the pixel period.

The image-reading device 1 can read an original having a narrow width at a time equivalent to the maximum number of pixels in image sensor IC chips for an original having a narrow width×the pixel period. Further, when reading an original having a narrow width, the image-reading device can achieve the same effects whether the original is left-justified or centered.

While the invention has been described in detail with reference to specific embodiments thereof, it would be apparent to those skilled in the art that many modifications and variations may be made therein without departing from the spirit of the invention, the scope of which is defined by the attached claims.

For example, the image-reading device 10 is provided with the size input unit (not shown) into which a user inputs the size of the original and the position of the original, that is, whether the original is left-justified or centered in the preferred embodiment. However, the image-reading device 10 may be provided with sensors that detect the size of the original and the position of the original instead of the size input unit.

In the preferred embodiment, the switches SW1, SW2 and SW3 are switched based on whether the original is A4-size or A3-size. However, the switches SW1, SW2 and SW3 may be switched based on whether the original is letter size or double-letter size.

What is claimed is:

1. An image-reading device comprising:
   a plurality of image sensor chips juxtaposed along a line extending in a widthwise direction of an original document carrying images thereon, each image sensor chip including a plurality of image sensors, reading the images on the original document, and generating image signals;
   a switch that is configured to combine at least two image sensor chips into one virtual image sensor chip;
   an output selector that allows the image signals from the virtual image sensor chip and remaining image sensor chip to be outputted; and
   a controller that controls the switch depending on the width of the original document, and controls, depending on the width of the original document, the output selector to allow the image signals to be outputted.

2. The image-reading device according to claim 1, further comprising an A/D converter including a plurality of input terminals into which the image signals are inputted,
   wherein the image signal is in an analog form, and the A/D converter converts the image signals inputted to the plurality of input terminals to digital signals.

3. The image-reading device according to claim 2, wherein the image signals inputted into the input terminal of the A/D converter are processed in parallel.

4. The image-reading device according to claim 2, wherein the image sensor chip includes first, second, third, fourth and fifth image sensor chips arranged in a stated order, and the A/D converter includes three input terminals, a total number of the plurality of image sensor chips corresponding to a width of an A-3 size original document,
   wherein when the original document is A3-size, the switch combines the first image sensor chip with the second image sensor chip, and combines the fourth image sensor chip with the fifth image sensor chip.

5. The image-reading device according to claim 4, wherein each of the first, fourth and fifth image sensor chips can read m-number pixels, and each of the second and third image sensor chips can read n-number pixels, a relationship between m and n being such that m<n, wherein an A-4 size original document has (n+2m) pixels in the widthwise direction, wherein when the original document is A4-size and the width of the A4-size original document corresponds to the first, second and third image sensor chips, the controller controls the switch not to combine the first image sensor chip with the second image sensor chip, and controls the trigger selector to allow the trigger signal to be provided to the first, second and third image sensor chips individually.

6. The image-reading device according to claim 5, further comprising an output selector that allows the image signals to be outputted to the input terminals of the A/D converter, wherein the controller controls, depending on the width of the original document, the output selector to allow the image signals to be outputted to the input terminals of the A/D converter, wherein the controller controls the output selector to allow the image signals generated by the first, second and third image sensor chips to be outputted to the A/D converter.

7. The image-reading device according to claim 4, wherein each of the first, fourth and fifth image sensor chips can read m-number pixels, and each of the second and third image sensor chips can read n-number pixels, a relationship between m and n being such that m<n, wherein an A-4 size original document has (n+2m) pixels in the widthwise direction, wherein when the original document is A4-size and the width of the A-4 size original document corresponds to the second, third and fourth image sensor chips, the controller controls the switch not to combine the first image sensor chip with the second image sensor chip and the fourth image sensor chip with the fifth image sensor chip, and controls the trigger selector to allow the trigger signals to be provided to the second, third and fourth image sensor chips individually.

8. The image-reading device according to claim 7, further comprising an output selector that allows the image signals to be outputted to the input terminals of the A/D converter, wherein the controller controls, depending on the width of the original document, the output selector to allow the image signals to be outputted to the input terminals of the A/D converter, wherein the controller controls the output selector to allow the image signals generated by the second, third and fourth image sensor chips to be outputted to the A/D converter.

9. The image-reading device according to claim 1, wherein a total widthwise length of the virtual image sensor chip and remaining image sensor chip corresponds to the width of the original document.

10. The image-reading device according to claim 1, wherein the controller controls the output selector to prevent the image signals generated by the virtual image sensor chip and remaining image sensor chip located beyond the width of the original document from being outputted.

11. The image-reading device according to claim 1, further comprising:

a trigger signal generator that generates a trigger signal and outputs the trigger signals to each of the virtual image sensor chip and remaining image sensor chip in parallel, wherein each of the virtual image sensor chip and remaining image sensor chip starts reading the image in response to the trigger signal; and a trigger selector that allows the trigger signal to be provided to selected ones of the virtual image sensor and remaining image sensor chip, wherein the controller controls, depending on the width of the original document, the trigger allows the trigger signal to be provided to selected ones of the virtual image sensor chip and remaining image sensor chip.

12. The image-reading device according to claim 1, wherein a number of pixels that the virtual image sensor chip can read is equal to or larger than a number of pixels that each of the remaining image sensor chips can read.

13. The image-reading device according to claim 1, the image sensor chip is of a contact type.

14. An image-reading device comprising:

a plurality of image sensor units juxtaposed along a line extending in a widthwise direction of an original document carrying images thereon, each image sensor unit including a plurality of image sensors, reading the images on the original document, and generating image signals;

a switch that is configured to divide at least one of the plurality of image sensor units into a plurality of sensor segments so that each sensor segment includes at least one of the plurality of image sensors;

an output selector that allows the image signals from the at least one of the plurality of sensor segments and remaining image sensor units to be outputted; and a controller that controls the switch depending on the width of the original document, and controls, depending on the width of the original document, the output selector to allow the image signals to be outputted.

15. The image-reading device according to claim 14, further comprising an A/D converter including a plurality of input terminals into which the image signals are inputted, wherein the image signal is an analog form, and the A/D converter converting the image signals inputted to the plurality of input terminals to digital signals.

16. The image-reading device according to claim 15, wherein the image signals inputted into the input terminal of the A/D converter are processed in parallel.

17. The image-reading device according to claim 15, further comprising:

a trigger signal generator that generates a trigger signal and outputs the trigger signal to each of the sensor segments and remaining image sensor units in parallel, wherein each of the sensor segments and remaining image sensor units start reading the image in response to the trigger signal; and a trigger selector that allows the trigger signal to be provided to selected ones of the sensor segments and remaining image sensor units, wherein the controller controls, depending on the width of the original document, the trigger selector to allow the trigger signal to be provided to selected ones of the sensor segment and remaining image sensor units.

18. The image-reading device according to claim 17, wherein the plurality of image sensor units include first, second and third image sensor units arranged in a stated order, and the A/D converter includes three input terminals, a total number of the plurality of image sensor units corresponding to a width of an A-3 size original document, wherein when the original documents is A3-size, the switch does not divide the image sensor units.

19. The image-reading device according to claim 18, wherein the switch divides the first image sensor unit into a first-first and first-second sensor segments arranged in a stated order, and divides the third image sensor unit into a third-first and third-second sensor segments arranged in a stated order, wherein the first-first, third-first and third-second sensor segments can read m-number pixels, and the first-second and second sensor segments can read n-number pixels, a relationship between m and n being such that m<n, wherein an A-4 size original has (n+2m) pixels in the widthwise direction, wherein when the original document is A4-size and the width of the A4-size original document corresponds to the first-first, first-second and second sensor segments, the controller controls the switch to divide the first image sensor unit into the first-first and first-second sensor segments, and controls the trigger selector to allow the trigger signal to be provided to the first-first and first-second sensor segments and second image sensor unit individually.

20. The image-reading device according to claim 19, further comprising an output selector that allows the image signals to be outputted to the input terminals of the A/D converter, wherein the controller controls, depending on the width of the original document, the output selector to allow the image signals to be outputted to the input terminals of the A/D converter, wherein the controller controls the output selector to allow the image signals generated by the first, the second, and the third image sensor units to be outputted to the A/D converter.

21. The image-reading device according to claim 18, wherein the switch divides the first image sensor unit into a first-first and first-second sensor segments arranged in a stated order, and divides the third image sensor unit into a third-first and third-second sensor segments arranged in a stated order, wherein the first-first, third-first and third-second sensor segments can read m-number pixels, and the first-second and second sensor segments can read n-number pixels, a relationship between m and n being such that m<n, wherein an A-4 size original has (n+2m) pixels in the widthwise direction, wherein when the original document is A4-size and the width of the A-4 size original document corresponds to the first-second, second and third-first sensor segments, the controller controls the switch to divide the first image sensor unit into the first-first and first-second sensor segments and the third image sensor unit into the third-first and third-second sensor segments, and controls the trigger selector to allow the trigger signals to be provided to the first-second and third-first sensor segments and second image sensor unit individually.

22. The image-reading device according to claim 21, further comprising an output selector that allows the image signals to be outputted to the input terminals of the A/D converter, wherein the controller controls, depending on the width of the original document, the output selector to allow the image signals to be outputted to the input terminals of the A/D converter, wherein the controller controls the output selector to allow the image signals generated by the first-second and third-first sensor segments to be outputted to the A/D converter.

23. The image-reading device according to claim 14, wherein a total widthwise length of the sensor segment and remaining image sensor units corresponds to the width of the original document.

24. The image-reading device according to claim 14, wherein the controller controls the output selector to prevent the image signals generated by the sensor segment and remaining image sensor units located beyond the width of the original document from being outputted.

25. The image-reading device according to claim 14, wherein a number of pixels that each of the remaining image sensor units can read is equal to or larger than a number of pixels that each of the sensor segments can read.

26. The image-reading device according to claim 14, wherein at least one of the plurality of image sensor units is of a contact type.

* * * * *